W. H. PARLIN.
CULTIVATOR.
APPLICATION FILED JAN. 12, 1910.
1,013,306.
Patented Jan. 2, 1912.
2 SHEETS—SHEET 2.
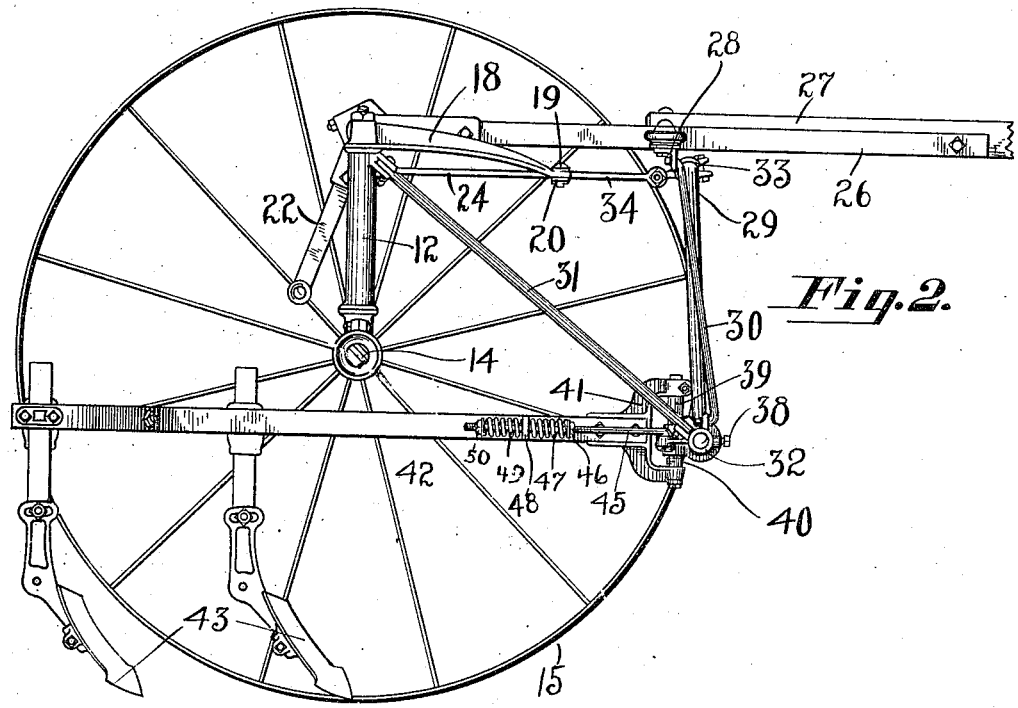
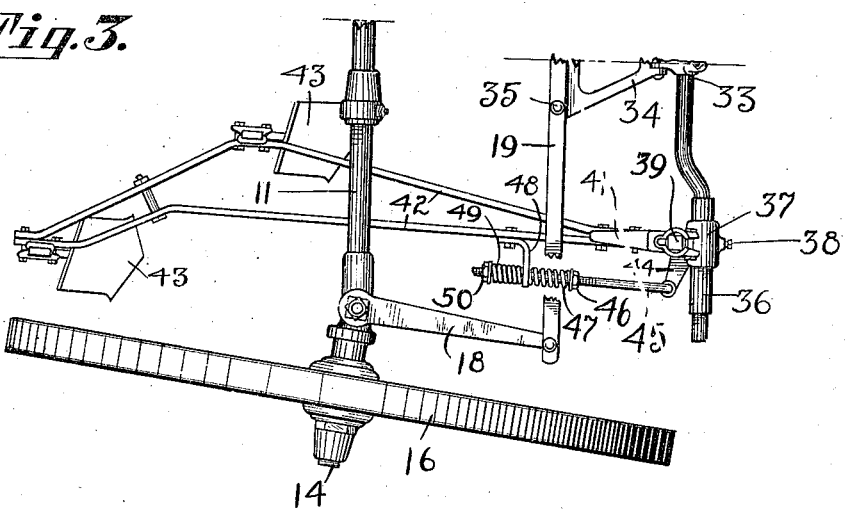
WITNESSES:
INVENTOR

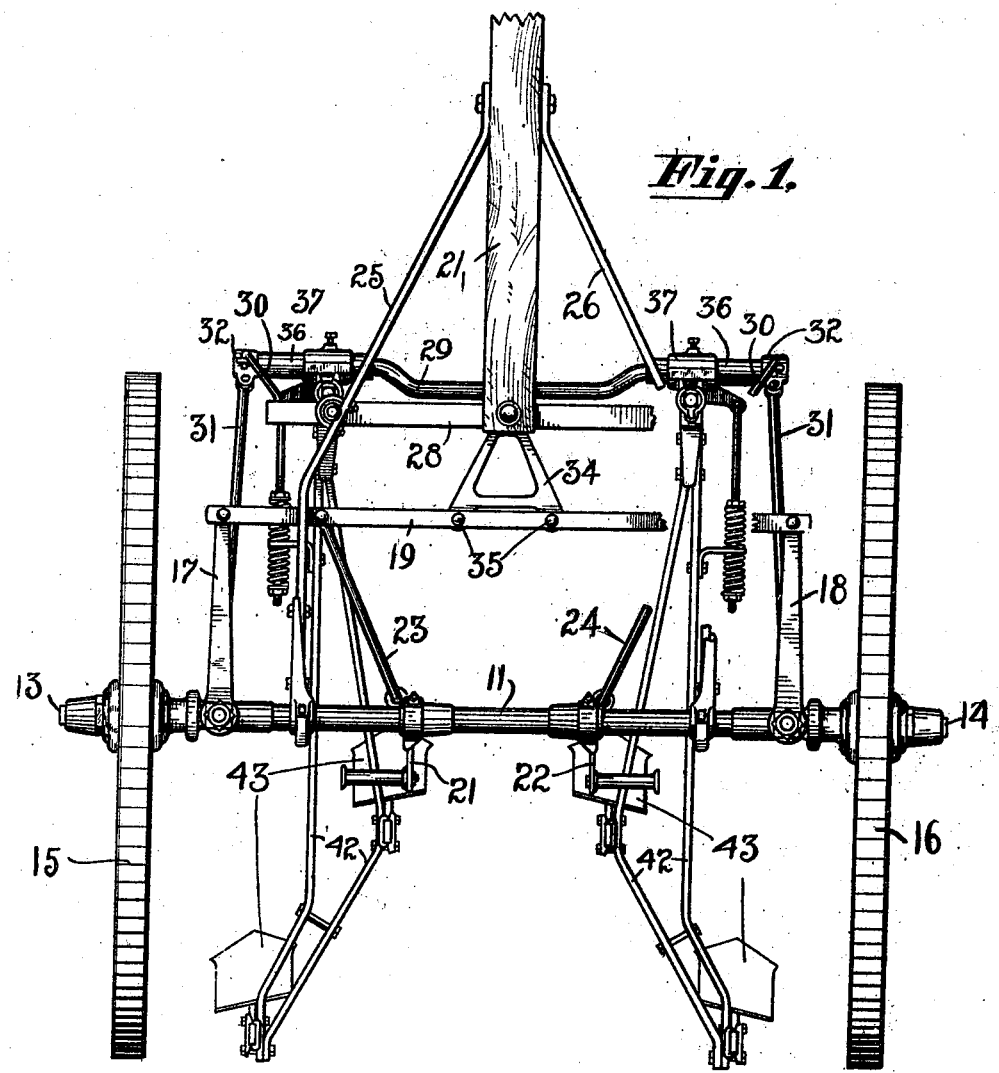

UNITED STATES PATENT OFFICE.

WILLIAM H. PARLIN, OF CANTON, ILLINOIS, ASSIGNOR TO PARLIN AND ORENDORFF COMPANY, OF CANTON, ILLINOIS, A CORPORATION OF ILLINOIS.

CULTIVATOR.

1,013,306. Specification of Letters Patent. Patented Jan. 2, 1912.

Application filed January 12, 1910. Serial No. 537,710.

*To all whom it may concern:*

Be it known that I, WILLIAM H. PARLIN, a citizen of the United States, residing at Canton, in the county of Fulton, State of Illinois, have invented certain new and useful Improvements in Cultivators, of which the following is a specification, reference being had to the accompanying drawings.

This invention relates to improvements in cultivators, and has for its object to provide new and improved means for controlling the position of the gang-beams relative to the arch, or other part of the frame work upon which they are mounted.

In cultivators in which the wheels have been angled so as to deflect the machine as a whole to one side, and in those in which the gangs have been attached at their forward ends to a shovel arch which has been adapted to be shifted transversely of the machine, it has been customary to provide means for insuring that the rear ends of the gangs should move in unison with the arch and to the same extent, so that when the gangs have been shifted sidewise all the shovels of each gang have been moved sidewise together. This construction, however, involved a great deal of unnecessary labor on the part of the driver, in that when he wished to move the inner forward shovel he was compelled at the same time to move the rear outer shovel also to the same extent. It is of course the inner shovels adjacent to the row being cultivated that have to be moved and very seldom would the outer shovels of themselves have to be shifted sidewise. In order to avoid being compelled unnecessarily to shift the rear outer shovel the same as the forward inner shovel in cultivators of this class, I pivot the gangs on the arch so as to swing laterally thereon, whereby when the arch is shifted the rear shovel of the gang will ordinarily be moved laterally very little or at least very gradually, while the shovel or shovels farther forward will be moved to a greater extent, depending upon their nearness to the pivot point where the movement is of course greatest.

It is the object of my invention to provide means, for cultivators in which the gangs are pivoted so as to swing laterally and particularly for the class of cultivators above mentioned, which shall tend to hold the gangs against movement laterally relative to the arch.

Another object is to provide means which shall tend to hold the gangs against movement laterally from any predetermined desired position relative to said arch.

I have accomplished these objects by the means shown in the drawings and hereinafter described.

That which I believe to be new will be set forth in the claims.

In the drawings:—Figure 1 is a top or plan view of my improved cultivator with certain of the parts broken away the better to show the construction. Fig. 2 is a side elevation with one carrying wheel cut away. Fig. 3 is a top or plan view of a part of the machine, partly broken away, showing the position of the parts at that side of the machine just at the moment that the wheels are being angled.

Referring to the drawings, 11 indicates the crossbar of the main arch of the cultivator, one of the upright portions of which is shown in Fig. 2 and indicated by 12.

13—14 indicate axles, each bent in a right angle, journaled in said upright portions of the arch, the horizontal portions of which axles have journaled upon them carrying wheels 15—16.

17—18 indicate arms projecting forward from the upper ends of the axle members 13—14, and non-rotatably secured thereon.

19—20 indicate crossbars secured to the forward ends of the arms 17—18, by the movement of which longitudinally of themselves the wheels may be angled, as will be readily understood.

21—22 indicate foot-levers pivotally mounted on the crossbar 11 and connected by means of links 23—24 with the crossbars 19—20 whereby by the rocking of the foot-levers the crossbars 19—20 may be moved longitudinally of themselves.

25—26 indicate hounds connected at their rear ends to the crossbar 11 and at their forward ends to a tongue 27.

28 indicates a crossbar suitably secured to the hounds 25—26 and to the end of the tongue, being in the construction shown in the form of an angle-iron.

It will be understood that in practice the cultivator may be provided with a seat of any suitable type supported in the frame-work in any approved manner in a convenient position therein.

29 indicates a shovel-arch supported in position relative to the remainder of the frame by links 30—31 at each side of the machine, said links being pivotally attached at their lower ends to sleeves 32 suitably secured upon the ends of the arch and being pivotally attached at their upper ends to suitable parts of the frame. At its upper end, the arch has secured upon it a sleeve 33 which is pivotally attached to the front end of a plate 34 whose rear end is secured by suitable pins 35 to the crossbars 19—20. By this construction, the arch 29 is adapted to be moved transversely of the machine with the crossbars 19—20.

Inasmuch as all of the parts above described form no part of themselves of my present invention but may be of any approved and well-known type suitable for the purpose, it is believed that further description herein is not required, it being readily understood that by the operation of the foot-levers the arch 29 may be shifted to one side or the other, the wheels being at the same time angled to deflect the cultivator as a whole in the direction in which the arch is shifted.

Coming now to the mounting of the shovel gang on the arch 29, 36 indicates sleeves loosely mounted on the horizontal lower ends of the arch 29 and prevented from slipping off therefrom by the sleeves 32. 37 indicates shorter sleeves secured in position on the sleeves 36 at any desired points thereon by set-screws 38.

39—40 indicate upwardly and downwardly extending lugs on each of the sleeves 37.

41 indicates two yoke-shaped brackets, the lower arm of each of which is provided with an opening adapted to rotatably fit upon one of the downwardly-extending lugs 40, and the upper arm of each of which terminates in a split ring which is adapted to be forced upon one of the upwardly-extending lugs 39 and secured thereon by a bolt as shown or otherwise, the construction being such that the brackets are free to rock laterally on the lugs.

42 indicates the plow beams secured at their forward ends to the brackets 41 and carrying on their rear portions shovels 43. In the construction shown, the beam of each gang consists of two bars suitably secured together, but any other suitable construction of course may be employed.

44 indicates an arm extending outwardly from each sleeve 37.

45 indicates rods each pivotally connected at its forward end to the outer end of one of said arms 44. The rear ends of these rods are screw-threaded and upon each is screwed a nut 46, against which bears one end of a spring 47 mounted on said rod, the other end of which spring bears against an arm 48 projecting outwardly from the beam 42, a suitable opening in the arm being provided through which the rod passes. Upon the end of the rod 45 on the other side of the arm 48 is mounted a spring 49, the rear end of which bears against a nut 50 screwed on the end of said rod.

It will be understood that with the beam 42 placed in its normal desired position laterally relative to the arch, the nuts 46 and 50 may be tightened up to any desired degree to compress the springs 47 and 49 equally, the springs thus tending to hold the beam yieldingly against movement to one side or the other. If then it is desired that the beam stand normally farther toward the wheel, both nuts 46 and 50 may be moved forward on the rod 45, or if it is desired that the gangs stand nearer together the nuts 46 and 50 may be moved to the rear to the desired extent.

What I claim as my invention and desire to secure by Letters Patent is,—

1. In a cultivator, the combination of a frame, a beam pivotally mounted on said frame and adapted to swing laterally thereon, a link pivotally connected to said frame at one side of the pivot point of said beam thereon, a bearing on said link, another bearing on said beam in rear of the bearing on said link, and a spring interposed between said two bearings and tending to hold said beam against swinging toward the side at which the link is mounted.

2. In a cultivator, the combination of a frame, a beam pivotally mounted on said frame and adapted to swing laterally thereon, a link pivotally connected to said frame at one side of the pivot point of said beam thereon, a bearing on said beam, another bearing on said link in rear of said bearing on said beam, and a spring interposed between said two bearings and tending to hold said beam against swinging toward the opposite side from that at which the link is mounted.

3. In a cultivator, the combination of a frame, a beam pivotally mounted on said frame and adapted to swing laterally thereon, a link pivotally connected to said frame at one side of the pivot point of said beam thereon, a bearing on said beam, two bearings on said link, a spring interposed between one of the bearings on said link and the bearing on said beam, and a second spring interposed between the other of said bearings on said link and said bearing on said beam, said springs tending to hold said beam against swinging laterally.

4. In a cultivator, the combination of a frame, a beam pivotally mounted on said frame and adapted to swing laterally thereon, a link pivotally connected to said frame at one side of the pivot point of said beam thereon, extending backward therefrom and passing through a bearing carried by said beam, means for simultaneously adjusting the forward ends of said beam and said link laterally relative to said frame, and yielding means bearing on said link and on said beam tending to hold said beam against swinging laterally.

5. In a cultivator, the combination of a frame, a sleeve rotatably mounted on a horizontal portion of said frame, a second sleeve mounted on said first sleeve, means for securing said second sleeve at any adjusted position on said first sleeve, a beam pivotally mounted on said second sleeve and adapted to swing laterally relative to said frame, a link mounted on said second sleeve at one side of the pivot point of said beam thereon and adapted to swing laterally thereon, and yielding means bearing on said link and on said beam tending to hold said beam against swinging laterally.

6. In a cultivator, the combination of a frame, a beam pivotally mounted on said frame and adapted to swing laterally thereon, a bearing on said beam, a spring interposed between said bearing and said frame adapted to hold said beam yieldingly against swinging in one direction, and a spring interposed between said bearing and said frame adapted to hold said beam yieldingly against swinging in the opposite direction.

7. In a cultivator, the combination of a frame, a beam pivotally mounted on said frame and adapted to swing laterally thereon, a bearing on said beam, a spring interposed between said bearing and a part of said frame in front thereof for holding said beam yieldingly against swinging in one direction, and a spring interposed between said bearing and a part of said frame in rear thereof for holding said beam yieldingly against swinging in the opposite direction.

WILLIAM H. PARLIN.

Witnesses:
CHAS. H. DOBBIN,
L. WILLIAMS.